(12) United States Patent
Zamiska et al.

(10) Patent No.: US 12,105,514 B1
(45) Date of Patent: Oct. 1, 2024

(54) SYSTEM FOR PLANNING EXPLORATION BY AUTONOMOUS MOBILE DEVICE

(71) Applicant: AMAZON TECHNOLOGIES, INC., Seattle, WA (US)

(72) Inventors: James Charles Zamiska, Palo Alto, CA (US); Jong Jin Park, Sunnyvale, CA (US); Mohit Deshpande, San Jose, CA (US); Rajasimman Madhivanan, San Francisco, CA (US); Dhruva Kumar, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 416 days.

(21) Appl. No.: 17/445,230

(22) Filed: Aug. 17, 2021

(51) Int. Cl.
    *G01C 22/00*     (2006.01)
    *G05D 1/00*     (2006.01)
    *G06T 7/579*     (2017.01)

(52) U.S. Cl.
    CPC ......... *G05D 1/0221* (2013.01); *G05D 1/0238* (2013.01); *G05D 1/0274* (2013.01); *G06T 7/579* (2017.01); *G06T 2207/30244* (2013.01)

(58) Field of Classification Search
CPC .. G05D 1/0221; G05D 1/0238; G05D 1/0274; G05D 2201/0207; G06T 7/579; G06T 2207/30244
See application file for complete search history.

(56) References Cited

U.S. PATENT DOCUMENTS

| | | | |
|---|---|---|---|
| 2009/0210092 A1* | 8/2009 | Park | G05D 1/0251 901/1 |
| 2011/0054689 A1* | 3/2011 | Nielsen | G05D 1/0214 700/258 |

* cited by examiner

*Primary Examiner* — Adam M Alharbi
(74) *Attorney, Agent, or Firm* — Lindauer Law, PLLC

(57) ABSTRACT

An autonomous mobile device (AMD) may move around a physical space to perform tasks. The AMD may explore the physical space to determine map data characterizing the physical space. An exploration system maintains a world snapshot that is representative of the AMD with respect to the physical space. A plurality of planning algorithm modules are available, each able to achieve a particular exploration goal or operate under particular conditions such as initial motion, loop closure, frontier exploration, and so forth. One or more planning algorithms are selected and provided with the world snapshot data. These planning algorithms provide responses and may also determine plan data. The resulting plan data is then selected for execution. The execution of the selected plan data operates the AMD to explore the physical space.

21 Claims, 6 Drawing Sheets

US 12,105,514 B1

SYSTEM FOR PLANNING EXPLORATION BY AUTONOMOUS MOBILE DEVICE

BACKGROUND

Every day, a user faces a variety of tasks both personal and professional that need to be attended to. These may include helping in the care of others, such as children or the elderly, working from home, taking care of the home, staying in contact with others, and so forth. Devices that assist in these tasks may help the user perform these tasks better or may allow the user time to attend to other tasks.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
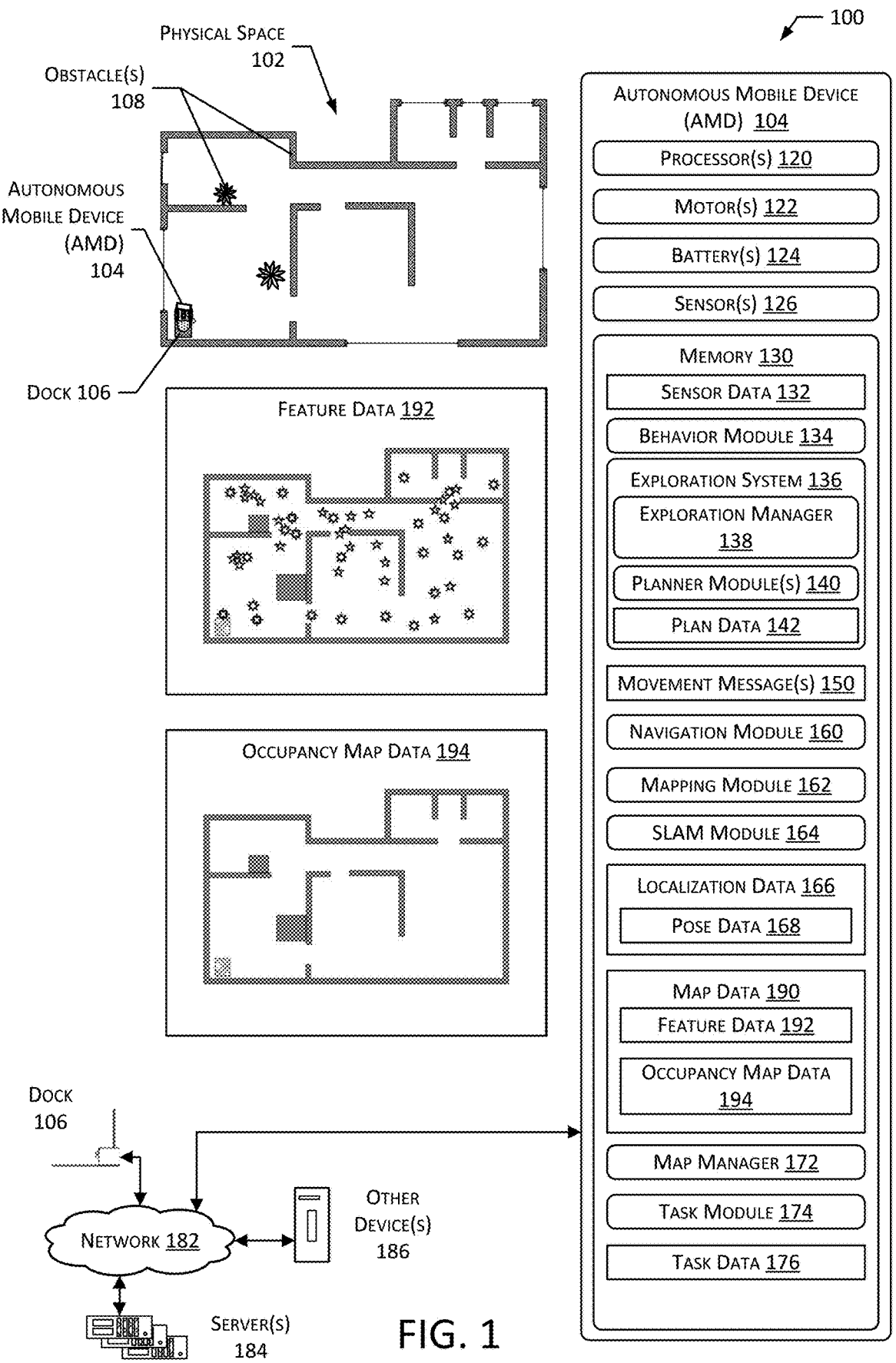
FIG. 1 illustrates a system to plan and execute exploration of a physical space by an Autonomous Mobile Device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) is capable of autonomous movement from one location in a physical space to another location without being controlled by a user. A user may interact with the AMD and the AMD may perform tasks that involve moving in the physical space, displaying information, accepting input, and so forth. To navigate between specified locations in the physical space, the AMD may determine occupancy map data that indicates where obstacles are located in the physical space that impede movement. The occupancy map data may include other information, such as semantic labels for particular rooms, obstacles, and so forth. The AMD may use the occupancy map data to move between locations of the physical space. For example, if the AMD is instructed to move "to the kitchen", the AMD would need to know where the "kitchen" is located and would use the occupancy map data to plan a path from a current location to the kitchen.

The AMD explores the physical space, acquiring sensor data from one or more sensors, and processing that sensor data to determine the occupancy map data. Different exploration techniques may be used based on the AMD's understanding of the environment. For example, when the AMD is first powered on and is "out of the box", it has no occupancy map data, and an initial set of minimal motions may be undertaken to move the AMD and acquire sensor data from different poses. For example, a pose is a location in the physical space and a particular orientation with respect to the physical space. Once the AMD has completed determination of the occupancy map data, the occupancy map data may be checked to confirm accuracy before exploration concludes.

Traditionally a robot has used a fixed monolithic technique for exploring a physical space. However, this results in a variety of drawbacks. The physical space may be dynamic involving people, pets, changing lighting conditions, and so forth. Previous techniques that attempted to address these factors have involved a monolithic design in which a complex algorithm attempts to address the expected use cases. However, such techniques result in highly complex programmatic code that is prone to failure, expensive to maintain, and may be inefficient when executing on a robot that has limited compute resources. For example, as new use cases are discovered, or failures due to previously unaccounted for edge cases are addressed, the monolithic design becomes increasingly difficult to maintain and more prone to unexpected failure modes.

Described in this disclosure is an exploration system for an AMD that facilitates expansion, improves overall performance, and may be executed on a device with limited computation resources. This exploration may be used to determine information such as an occupancy map that is representative of where obstacles are in the physical space, feature data that may be used to determine where the AMD is, and so forth.

An exploration manager maintains world snapshot data that is representative of the physical space as determined based on sensor data. In one implementation, the world snapshot data may be indicative of a set of poses of the AMD and their associated confidence data, since a last execution of the exploration manager.

The exploration system comprises several planner modules that may be used for exploration during multiple stages and one or more passes during each stage. Each planner module comprises a specialized algorithm to explore the physical space. For example, each planner module utilizes different techniques to explore the physical space. Each stage may be associated with a different set of planner modules. Some planner modules may be used during each stage, while other planner modules may be used only during a particular stage.

Different planner modules may be specialized to operate under different conditions, such as in dark light conditions, bright light conditions, unavailable or unusable sensor data, after failure to perform loop closure, to check map accuracy, and so forth. Some planner modules may be specialized to acquire sensor data to determine the occupancy map, while others may be specialized to acquire feature data to facilitate localization. During localization, the AMD may use sensor data about the surrounding physical space to try and determine where the AMD is in the physical space, and in what direction the AMD is pointed.

During a first stage, the exploration manager uses a first set of one or more planner modules to perform a first pass that moves the AMD through the physical space to acquire sensor data that is used to determine an occupancy map and some feature data. The exploration during the first pass may be incomplete, resulting in some unexplored areas of the physical space. In one implementation, the world snapshot data may comprise a pose graph of poses determined by a simultaneous localization and mapping (SLAM) module as the AMD moves through the physical space. The world snapshot data may also include other information such as an exploration map, historical data about previously executed plans to explore the physical space, and so forth. The exploration map may be based on the occupancy map data gathered to that point in time. In some implementations, the exploration map may include information with respect to frontiers. A frontier may be specified as a boundary between explored areas and unexplored areas. A second pass may be performed in which the AMD moves to gather information about the previously unexplored areas, resulting in those areas being explored. In some implementations, the exploration manager may deem the first stage to be complete when each of the set of planners associated with the first stage report no further plans to execute.

The exploration manager may initiate a second stage of exploration using a second set of one or more planner modules. The second set of one or more planner modules may differ from the first set of one or more planner modules. The second stage may be used to acquire additional information about the physical space. For example, the second stage of exploration may involve acquiring additional feature data. This feature data may be used to facilitate localization during subsequent operation. For example, the planner module may determine a convex hull path around a perimeter of the physical space. The AMD may then move along this path, at a first time in a first direction while determining feature data and then at a second time in a second direction while determining feature data. This allows the AMD to acquire feature data from different points-of-view, improving later attempts at localization.

The planner modules within a set of one or more planner modules are hierarchically arranged, and are executed in the order prescribed by that arrangement. The exploration system includes a plan selection module. During operation, the plan selection module sends a request to one or more of the planner modules in the set of one or more planner modules that are associated with a current stage. The request may include at least world snapshot data. Requests are made in the order indicated by the hierarchy. Responsive to the request, a planner module determines a response and may determine plan data. The response may indicate the output of the operation of the planner module, such as one of: new plan data has been determined, continuation of execution of a previously determined plan, no further plan data is determined, or a failure of the planner module has occurred.

The plan data determined by a planner module specifies a course of action that is used to operate the AMD. The plan data may be simple or complex sets of operations. For example, the plan data may invoke pause movement to suspend movement of the AMD in the physical space while the AMD processes data. In other examples the plan data may move the body of the AMD, rotate the body of the AMD, go to a specified pose, go observe a specified frontier, and so forth. The plan data may be processed to determine movement messages or other instructions. The movement messages may be used to operate the AMD to perform the planned movements.

As each planner module produces a response of "no further plan data is determined", the plan selection module subsequently sends a next request to the next planner module indicated in the hierarchy for the set of one or more planner modules. If no further subsequent planner modules remain in the hierarchy, the stage may complete. If another stage is specified, the plan selection module may proceed to send requests to the planner modules in the order specified.

In some implementations, the plan selection module may send a request to a planner module that is earlier in the hierarchy and previously responded with "no further plan data is determined". For example, if the world snapshot data indicates a confidence value in the current localization data is less than a threshold value, the plan selection module may initiate a planner module comprising a loop closure algorithm to perform a loop closure process.

The exploration system may determine the world snapshot data and operate the plan selection module on a specified schedule, such as every second. This allows the AMD to respond to changing conditions that may affect exploration. For example, the exploration system may select a different planner module to use in the event of a failure such as an inability to determine a pose based on SLAM.

The overall system is modular, allowing the system to be easily maintained, updated, and expanded. For example, selection logic implemented by the plan selection module may be readily updated. This selection logic may be changed without affecting the planner modules. In another example, a new planner module may be added or an existing planner module may be modified, without affecting other planner modules. Sets of one or more planner modules that are associated with different stages of exploration may be modified without affecting other sets. For example, hierarchical ordering may be changed, planner modules may be added or removed, and so forth.

By using the exploration system described in this disclosure an AMD is able to explore complex and dynamic physical spaces, develop an accurate occupancy map, and acquire feature data to facilitate localization during operation. Errors that occur during exploration are more likely to be resolved without user intervention. After completing exploration, the AMD may use the occupancy map and feature data to autonomously navigate from one location in the physical space to another. As one or more of the techniques or the hardware of the AMD changes, the exploration system may be readily updated, allowing ongoing use.

Illustrative System

FIG. 1 illustrates a system 100 to plan and execute exploration of a physical space by an AMD, according to some implementations.

A physical space 102 includes an autonomous mobile device (AMD) 104. The physical space 102 may be one or more floors within a residence, office, vessel, and so forth. The AMD 104 may be configured to dock or connect to a dock 106. The dock 106 may provide external power which the AMD 104 may use to charge a battery 124 of the AMD 104. The dock 106 may also provide a known pose to facilitate exploration. For example, exploration may start and conclude at the dock 106.

The physical space 102 may include various obstacles 108 such as walls, furniture, toys, ledges, or stairs that the AMD 104 is unable to traverse, and so forth. For example, stairs may be an obstacle to a relatively small AMD with wheels for locomotion. In comparison, stairs may not be an obstacle to an AMD with legs for locomotion.

The AMD 104 may include one or more hardware processors 120 (processors) configured to execute one or more stored instructions. The processors 120 may comprise one or more cores. The processors 120 may include microcontrollers, systems on a chip, field programmable gate arrays, digital signal processors, graphic processing units, general processing units, and so forth.

One or more motors 122 or other actuators enable the AMD 104 to move from one location in the physical space 102 to another. For example, a motor 122 may be used to drive a wheel attached to a chassis of the AMD 104, which causes the AMD 104 to move. The AMD 104 may turn, move forward, move backward, and so forth. In another example, actuators may move mechanical legs allowing the AMD 104 to walk.

The AMD 104 may include battery(s) 124 to provide electrical power for operation of the AMD 104. The battery 124 may be rechargeable, allowing it to store electrical energy obtained from an external source, such as the dock 106. In other implementations, a wireless power receiver may be used to provide power for operation of the AMD 104, recharge the battery 124, and so forth.

The AMD 104 may include one or more sensors 126. For example, the sensors 126 may include microphones, time-of-flight (TOF) sensors cameras, LIDAR, inductive sensors, and so forth. The sensors 126 may generate sensor data 132 and the inductive sensors may generate signal data indicative of measured signal strength. The sensors 126 are discussed in more detail with regard to FIG. 3.

The AMD 104 includes one or more memories 130. The memory 130 may comprise one or more non-transitory computer-readable storage media (CRSM). The memory 130 may store the sensor data 132 resulting from operation of the one or more sensors 126.

The memory 130 may store one or more modules. A behavior module 134 may be used to determine whether the AMD 104 is to explore, localize, or take other action. In some implementations, this may be based on data from a SLAM manager 470 as described with regard to FIG. 4. During exploration, the AMD 104 may operate the one or more sensors 126 to acquire sensor data 132. The sensor data 132 may be processed to determine occupancy map data 194 that is representative of the location of the obstacles 108 in the physical space 102. Exploration is discussed in more detail below.

Localization is the process of determining pose data 168 indicative of a pose of the AMD 104 in the physical space 102 at a particular time. The pose data 168 may indicate localization based on some external reference, such as features visible in the physical space 102. A feature is detectable by a sensor. For example, a feature within an image may comprise a shadow, edge of a door frame depicted in the image, and so forth. The sensor data 132 may be stored as, or used to determine, feature data 192 as described below.

A pose is indicative of a location and orientation within the physical space 102. For example, pose data 168 may be specified as coordinates of (+39.2, −10.2, 0, 0°, 0°, 301°). The coordinates may be specified with respect to an origin, such as a dock 106. The six coordinate values comprise a coordinate value of +39.2 meters (m) along an X-axis, a coordinate value of −10.2 m along a Y-axis, a coordinate value of 0 m along a Z-axis, and a coordinate value indicating rotation with respect to each of the axes, such as an orientation of 301 degrees relative to a specified direction with respect to rotation about a Z-axis. A Z-axis coordinate value may be indicative of a height value or elevation value for the AMD 104. A set of poses generated over time may describe a given AMD 104 trajectory. For example, trajectory data may comprise a time series of pose data 168.

During exploration, the AMD 104 may determine localization data 166 that includes the pose data 168 based on the sensor data 132. By knowing where the AMD 104 is, and which direction the sensors 126 of the AMD 104 are pointing, as provided by the localization data 166, the sensor data 132 may be used to determine information about where the obstacles 108 are in the physical space 102.

The exploration system 136 may include an exploration manager 138 and a plurality of planner modules 140. Operation of the exploration system 136 is described in more detail below with regard to FIG. 4. As an introduction, during operation of the exploration system 136, the exploration manager 138 sends requests to one or more planner modules 140. These requests may include world snapshot data. The world snapshot data may comprise pose data 168 that is indicative of a set of poses of the AMD 104 and confidence data associated with those poses, since a last execution of the exploration manager 138. For example, the world snapshot data may comprise a pose graph.

Each planner module 140 comprises a particular algorithm to explore the physical space 102. Different planner modules 140 may be specialized to operate under different conditions, such as in dark light conditions, bright light conditions, with unavailable or unusable sensor data 132, after failure to perform loop closure, to check accuracy of the occupancy map data 194, and so forth.

The order in which planner modules 140 are requested and used may be hierarchical, with some planner modules 140 being selected before others. For example, the exploration manager 138 may wait until an initial motion planner module 140 responds to a request with "no further plan to execute" before executing a final motion planner module 140. Responsive to the request, a planner module 140 may execute and determine a response and, in some situations, plan data 142. The response may indicate the output of the operation of the planner module 140, such as one of: new plan data 142 has been determined, continuation of execution of previously determined plan data 142, no further plan data 142 is determined, or a failure of the planner module 140 has occurred.

The exploration system 136 may include an execution manager to accept as input one or more of the response or the plan data 142. The plan data 142 may comprise instructions to operate the AMD 104, or may be used by the execution manager to determine instructions to operate the AMD 104. The plan data 142 may be simple instructions or complex sets of instructions associated with complex operations. For example, the plan data 142 may comprise an instruction to "pause movement". This instruction directs the AMD 104 to suspend operation of the motors 122 to prevent movement of the AMD 104 in the physical space 102. The "pause movement" may be used to allow the AMD 104 more time to process previously acquired sensor data 132 or perform other computational or communication activities. In some implementations plan data 142 may comprise, or may be used to determine, movement messages 150. For example, the execution manager may determine movement messages 150 based on the plan data 142. The movement messages 150 may be used to operate the AMD 104 to perform particular movements. In other examples the movement messages 150 may comprise instructions to move the body of the AMD 104, rotate the body of the AMD 104, go to a specified pose, go observe a specified frontier, and so forth.

The movement messages 150 may be provided to a navigation module 160. The navigation module 160 may process the movement messages 150 or other plan data 142 and implement one or more movements of the AMD 104. For example, the movement message 150 may be "go to previously stored pose 902". Responsive to this, the navigation module 160 may attempt to move the AMD 104 to the previously stored pose designated as "902". The navigation module 160 may use occupancy map data 194, as available.

The AMD 104 may include a mapping module 162. The mapping module 162 determines map data 190 that may comprise one or more of feature data 192 or occupancy map data 194. The occupancy map data 194 is a representation of the physical space 102 that includes obstacles 108 and their locations in the physical space 102.

A simultaneous localization and mapping (SLAM) module 164 may be used to determine localization data 166, such as pose data 168. For example, the sensors 126 may include cameras that acquire images of the physical space 102. These images are processed to determine feature data 192 representative of the presence of features in the images, such as edges of doors, shadows on the wall, texture on the walls, and so forth.

A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

The mapping module 162 may maintain the map data 190 that associates the feature data 192 with respect to the occupancy map data 194. For example, a pose associated with particular coordinates and orientation with respect to the occupancy map data 194 may be associated with feature data 192 indicative of the features visible from that pose.

While the AMD 104 is moving, the SLAM module 164 may provide as output a series of poses, each pose describing a location and rotations in the physical space 102. Each pose may be based, at least in part, on the apparent motion of observed features in the images. For example, from image to image at least some of the features that are described by descriptors will be in common. By determining the relative difference in apparent position in the image of the same feature as observed by two different cameras at the same time, the location of the camera with respect to the feature in the physical space 102 may be determined. At successive times, and as the AMD 104 moves and additional images are determined from locations in the physical space 102, the apparent change in position of the same feature across the additional images may be used to determine subsequent poses. In some implementations, an orientation may comprise information about six dimensions (6D), that of three orthogonal axes and corresponding rotations about those axes.

In some implementations, the SLAM module 164 may determine keyframe data comprising keyframes. The keyframe data may be associated with a particular pose. For example, a keyframe may comprise an image acquired by a camera while at a particular pose. In another example, the keyframe may comprise descriptors associated with one or more features determined from an image acquired by a camera while at a particular pose.

The SLAM module 164 may also use data from other sensors 126 such as motor encoders, inertial measurement units (IMU) with one or more accelerometers and gyroscopes, and so forth. For example, the IMU may generate inertial data indicative of rotations or accelerations along particular axes. This inertial data may be integrated to provide information about the movement of the AMD 104.

While the AMD 104 is operating, the sensors 126 may be used to determine sensor data 132 comprising information about the physical space 102.

During operation, the mapping module 162 uses the sensor data 132 from various sensors 126 to determine information such as where the AMD 104 is, how far the AMD 104 has moved, the presence of obstacles, where those obstacles are, and so forth. For example, the sensors 126 may comprise a time-of-flight (TOF) depth camera, ultrasound, radar, and so forth. Depth data from these sensors 126 may be indicative of whether an obstacle 108 is detected or not and includes information about the distance between the sensor 126 and the obstacle 108 and a relative direction, with respect to the sensor 126, of a detected obstacle 108. Sensor data 132 from cameras, LIDAR, or other devices may be processed by the SLAM module 164 to provide localization data 166. Based on this data, the mapping module 162 may determine the occupancy map data 194. The occupancy map data 194 represents the physical space 102. For example, the occupancy map data 194 may indicate the location of the obstacles 108.

The physical space 102 may be represented by map data 190 that may comprise a plurality of individual maps. The maps may comprise feature data 192, occupancy map data 194, and so forth. For example, each floor of a building may be expressed as different feature data 192 and occupancy map data 194. A map manager 172 may be used to determine adequacy of a map, whether two or more maps are representative of a contiguous space, and so forth. For example, the map manager 172 may be used to determine if occupancy map data 194 is deemed sufficient. In one implementation, occupancy map data 194 may be deemed sufficient if there are no unexplored frontiers and loop closure between a starting pose of the exploration and an ending pose of the exploration has been successfully completed. In another example, the map manager 172 may determine that sufficient feature data 192 is available. In one implementation, feature data 192 may be deemed sufficient if there is feature data 192 available in each room, feature data 192 is available proximate to each doorway, the feature data 192 comprises a minimum count of features, and so forth.

The AMD 104 may utilize one or more task modules 174. The task module 174 comprises instructions that, when executed, provide one or more functions. The task modules 174 may perform functions such as finding a user, following a user, presenting output on output devices 212 of the AMD 104, performing sentry tasks by moving the AMD 104 through the physical space 102 to determine the presence of unauthorized people, and so forth.

Tasks may be indicated by task data 176, and the task data 176 may be stored in a queue or some other memory structure within the memory 130. In some situations, the task may have been previously scheduled or enqueued before or during exploration. In some implementations, if localization is not necessary to perform a task, the task may be completed. For example, if the task is presenting an audible notification of an incoming message, the AMD 104 may perform the task. If the task requires occupancy map data 194 or other information, the AMD 104 may defer performance of the task until the data is available.

The AMD 104 may use a network 182 to access one or more servers 184. The servers 184 may process data from the AMD 104. The servers 184 may send data to the AMD 104 that may be subsequently used to operate the AMD 104.

The AMD 104 may also communicate with other devices 186. The other devices 186 may include one or more devices that are within the physical space 102 such as a home or associated with operation of one or more devices in the physical space 102. For example, the other devices 186 may include a doorbell camera, a garage door opener, a refrigerator, washing machine, and so forth. In some implementations the other devices 186 may include other AMDs 104, vehicles, and so forth.

Figure 2:
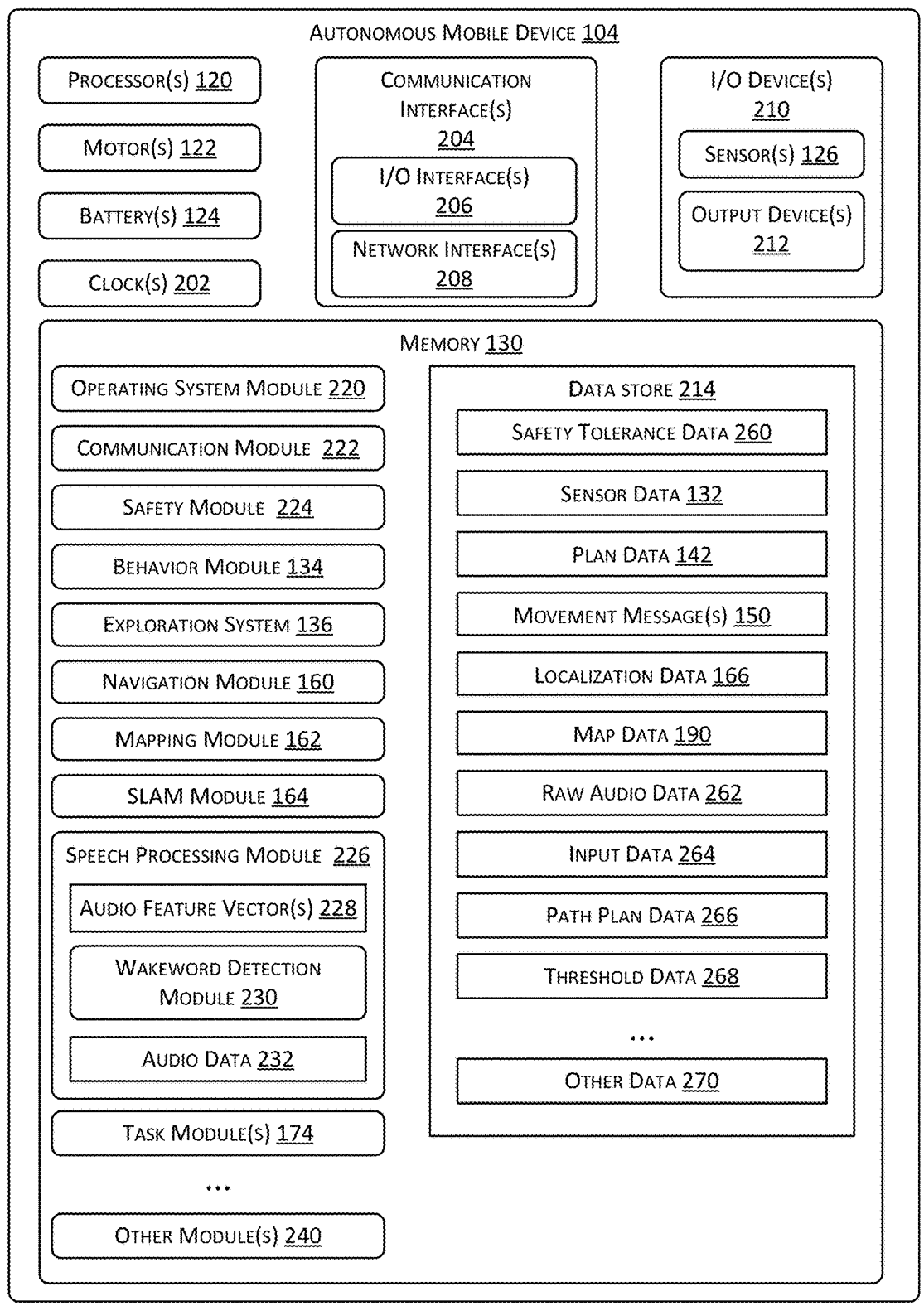
FIG. 2 is a block diagram of the components of the AMD, according to some implementations.

FIG. 2 is a block diagram 200 of the components of the AMD 104, according to some implementations.

As described, the AMD 104 may include one or more hardware processors 120 (processors) configured to execute one or more stored instructions. As described above, the AMD 104 may include one or more motors 122 or other actuators to enable the AMD 104 to move from one location in the physical space 102 to another.

The AMD 104 may include one or more batteries 124 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 120 may use data from the clock 202 to associate a particular time with an action, sensor data 132, and so forth. In some implementations, the exploration manager 138 may determine plan data 142 at a specified interval. For example, the exploration manager 138 may determine plan data 142 at one second intervals.

The AMD 104 may include one or more communication interfaces 204 such as input/output (I/O) interfaces 206, network interfaces 208, and so forth. The communication interfaces 204 enable the AMD 104, or components thereof, to communicate with other devices 186 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 210. The I/O devices 210 may include input devices such as one or more of a sensor 126, keyboard, mouse, scanner, and so forth. The I/O devices 210 may also include output devices 212 such as one or more of a motor 122, light, speaker, display, projector, printer, and so forth. The output devices 212 are discussed in more detail with regard to FIG. 3. In some embodiments, the I/O devices 210 may be physically incorporated with the AMD 104 or may be externally placed.

The network interfaces 208 may be configured to provide communications between the AMD 104 and other devices 186 such as other AMDs 104, the dock 106, routers, access points, and so forth. The network interfaces 208 may include devices configured to couple to personal area networks (PANs), local area networks (LANs), wireless local area networks (WLANS), wide area networks (WANs), and so forth. For example, the network interfaces 208 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104. The network interfaces 208 are discussed in more detail with regards to FIG. 3.

As shown in FIG. 2, the AMD 104 includes one or more memories 130. The memory 130 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 130 provides storage of computer-readable instructions, data structures, program modules, and other data for the operation of the AMD 104. Example functional modules are shown stored in the memory 130, although the same functionality may alternatively be implemented in hardware, firmware, or as a system on a chip (SoC).

The memory 130 may include at least one operating system (OS) module 220. The OS module 220 is configured to manage hardware resource devices such as the I/O interfaces 206, the I/O devices 210, the communication interfaces 204, and provide various services to applications or modules executing on the processors 120. The OS module 220 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

Also stored in the memory 130 may be a data store 214 and one or more of the following modules. These modules may be executed as foreground applications, background tasks, daemons, and so forth. The data store 214 may use a flat file, database, linked list, tree, executable code, script, or other data structure to store information. In some implementations, the data store 214 or a portion of the data store 214 may be distributed across one or more other devices 186 including other AMDs 104, servers 184, network attached storage devices, and so forth.

A communication module 222 may be configured to establish communication with other devices 186, such as other AMDs 104, an external server 184, a dock 106, and so forth. The communications may be authenticated, encrypted, and so forth.

Other modules within the memory 130 may include a safety module 224, the behavior module 134, the exploration system 136, the navigation module 160, the mapping module 162, the SLAM module 164, a speech processing module 226, the task modules 174, or other modules 240. The modules may access data stored within the data store 214, including safety tolerance data 260, sensor data 132, plan data 142, movement messages 150, localization data 166, map data 190, other data 270, and so forth.

The safety module 224 may access the safety tolerance data 260 to determine within what tolerances the AMD 104 may operate safely within the physical space 102. For example, the safety module 224 may be configured to stop the AMD 104 from moving when an extensible mast of the AMD 104 is extended. In another example, the safety tolerance data 260 may specify a minimum sound threshold which, when exceeded, stops all movement of the AMD 104. Continuing this example, detection of sound such as a human yell would stop the AMD 104.

Figure 4:
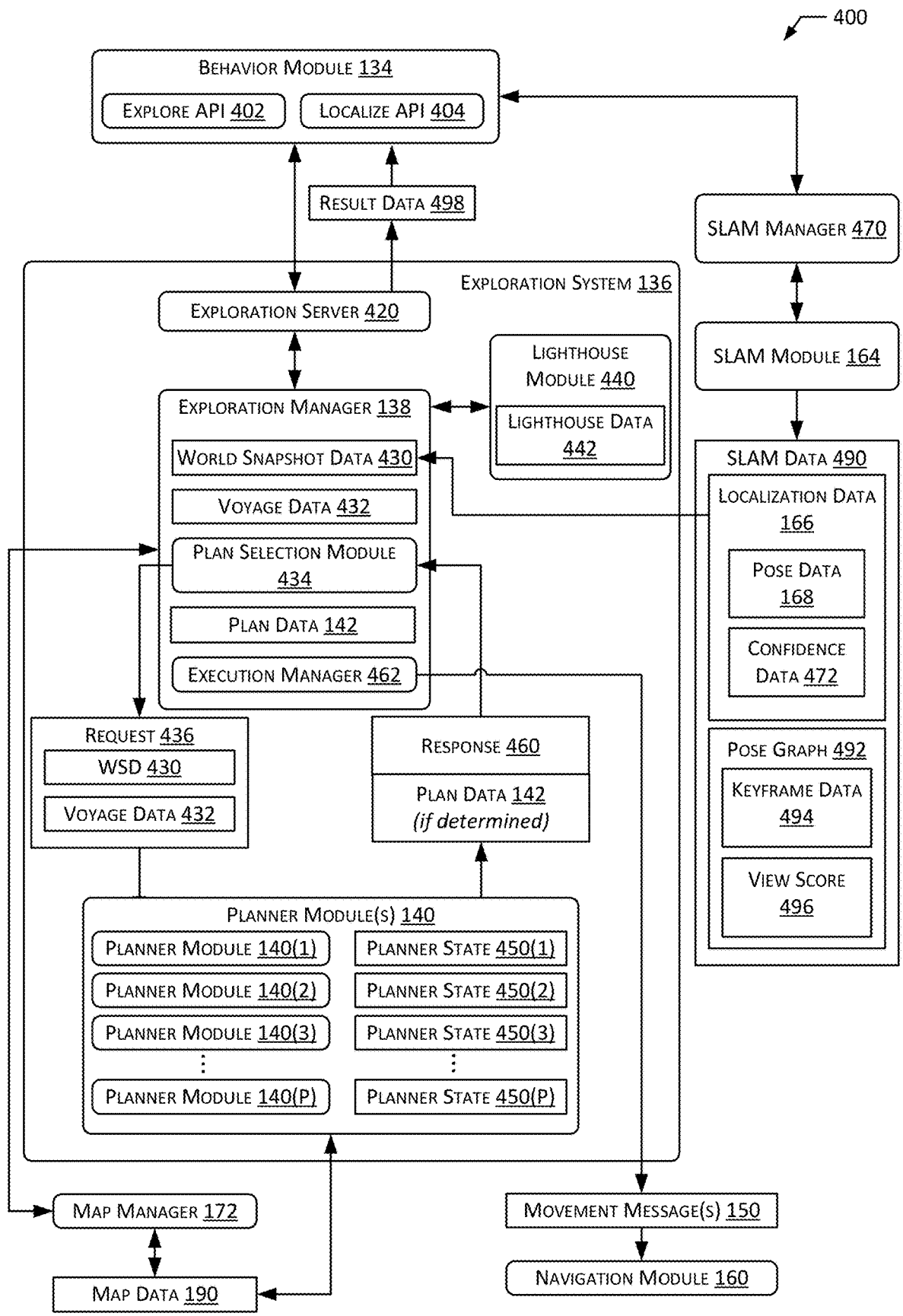
FIG. 4 illustrates an exploration system for an AMD that includes a plurality of planners, according to some implementations.

The behavior module 134 and the exploration system 136 are discussed in more detail with regard to FIG. 4.

The navigation module 160 provides the AMD 104 with the ability to navigate within the physical space 102 without real-time human interaction. The navigation module 160 may implement, or operate in conjunction with, the mapping module 162 to determine the occupancy map data 194 or other representation of the physical space 102. In one implementation, the mapping module 162 may use data obtained from a SLAM module 164. The SLAM module 164 may implement one or more simultaneous localization and mapping ("SLAM") techniques. The SLAM module may utilize one or more of maps, algorithms, beacons, or other techniques to navigate. The navigation module 160 may use the occupancy map data 194 to determine a set of possible paths along which the AMD 104 may move. One of these may be selected and used to determine path plan data 266 indicative of a path. For example, a possible path that is the shortest or has the fewest turns may be selected and used to determine the path. The path is then subsequently used to determine a set of commands that drive the motors 122 connected to the wheels. For example, the navigation module 160 may determine the current location within the physical space 102 and determine path plan data 266 that describes the path to a destination location.

The AMD 104 may use the navigation module 160 to navigate to a docking area that includes the dock 106. For example, if the AMD 104 determines to recharge one or more batteries 124, then the AMD 104 may use path plan data 266 to navigate to a destination location that is in front of the dock 106. The navigation module 160 may utilize various techniques during processing of sensor data 132. For example, image data obtained from cameras on the AMD 104 may be processed to determine one or more of corners, edges, planes, and so forth. In some implementations, corners may be detected, and the coordinates of those corners may be used to produce point cloud data. This point cloud data may then be used for SLAM or other purposes associated with mapping, navigation, and so forth.

The speech processing module 226 may be used to process utterances of the user. Microphones may determine audio in the presence of the AMD 104 and may send raw audio data 262 to an acoustic front end (AFE). The AFE may transform the raw audio data 262 (for example, a single-channel, 16-bit audio stream sampled at 16 kHz), determined by the microphone, into audio feature vectors 228 that may ultimately be used for processing by various components, such as a wakeword detection module 230, speech recognition engine, or other components. The AFE may reduce noise in the raw audio data 262. The AFE may also perform acoustic echo cancellation (AEC) or other operations to account for output audio data that may be sent to a speaker of the AMD 104 for output. For example, the AMD 104 may be playing music or other audio that is being received from a network 182 in the form of output audio data. To avoid the output audio interfering with the device's ability to detect and process input audio, the AFE or other component may perform echo cancellation to remove the output audio data from the input raw audio data 262, or other operations.

The AFE may divide the raw audio data 262 into frames representing time intervals for which the AFE determines a number of values (i.e., features) representing qualities of the raw audio data 262, along with a set of those values (i.e., a feature vector or audio feature vector 228) representing features/qualities of the raw audio data 262 within each frame. A frame may be a certain period of time, for example a sliding window of 25 ms of audio data 232 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 262, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 228 (or the raw audio data 262) may be input into a wakeword detection module 230 that is configured to detect keywords spoken in the audio. The wakeword detection module 230 may use various techniques to determine whether raw audio data 262 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 230 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 230 may compare audio data 232 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning, or smoothing is applied for decision making. Other techniques for wakeword detection, such as those known in the art, may also be used.

Once the wakeword is detected, circuitry or applications of the local AMD 104 may "wake" and begin transmitting audio data 232 (which may include one or more of the raw audio data 262 or the audio feature vectors 228) to one or more server(s) 184 for speech processing. The audio data 232 corresponding to audio obtained by the microphone may be processed locally on one or more of the processors 120, sent to a server 184 for routing to a recipient device, or may be sent to the server 184 for speech processing for interpretation of the included speech (either for purposes of enabling voice-communications and/or for purposes of executing a command in the speech). The audio data 232 may include data corresponding to the wakeword, or the portion of the audio data 232 corresponding to the wakeword may be removed by the AMD 104 before processing by the navigation module 160, before to sending to the server 184, and so forth.

The speech processing module 226 may include or access an automated speech recognition (ASR) module. The ASR module may accept as input raw audio data 262, audio feature vectors 228, or other sensor data 132 and so forth and may produce as output the input data 264 comprising a text string or other data representation. The input data 264 comprising the text string or other data representation may be processed to determine the command to be executed. For example, the utterance of the command "robot, come here" may result in input data 264 comprising the text string "come here". The wakeword "robot" may be omitted from the input data 264. The input data 264 may then be provided to the navigation module 160.

Modules described herein, such as the mapping module 162, may provide various processing functions such as de-noising, filtering, and so forth. Processing of sensor data 132, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 132. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 132 or other data. For example, the ANN may be trained using a supervised learning algorithm such that object identifiers are associated with images of particular objects within training images provided to the ANN. Once trained, the ANN may be provided with the sensor data 132 and produce output indicative of the object identifier.

The AMD 104 may move responsive to a determination made by an onboard processor 120, in response to a command received from one or more communication interfaces 204, as determined from the sensor data 132, and so forth. For example, an external server 184 may send a command that is received using the network interface 208. This command may direct the AMD 104 to proceed to find a particular user, follow a particular user, and so forth. The AMD 104 may then process this command and use the navigation module 160 to determine the directions and distances associated with carrying out the command. For example, the command to "come here" may result in the task module 174 sending a command to the navigation module 160 to move the AMD 104 to a particular location near the user and orient the AMD 104 in a particular direction.

The AMD 104 may connect to the network 182 using one or more of the network interfaces 208. In some implementations, one or more of the modules or other functions described here may execute on the processors 120 of the AMD 104, on the server 184, or a combination thereof. For example, one or more servers 184 may provide various functions, such as ASR, natural language understanding (NLU), providing content such as audio or video to the AMD 104, and so forth.

The other modules 240 may provide other functionality, such as object recognition, speech synthesis, user identification, and so forth. The other modules 240 may comprise a speech synthesis module that is able to convert text data to human speech. For example, the speech synthesis module may be used by the AMD 104 to provide speech that a user is able to understand.

The data store 214 may store the other data 270 as well. For example, localization settings may indicate local preferences such as language, user identifier data may be stored that allows for identification of a particular user, and so forth. The data store 214 may also store values for various thresholds as threshold data 268.

Figure 3:
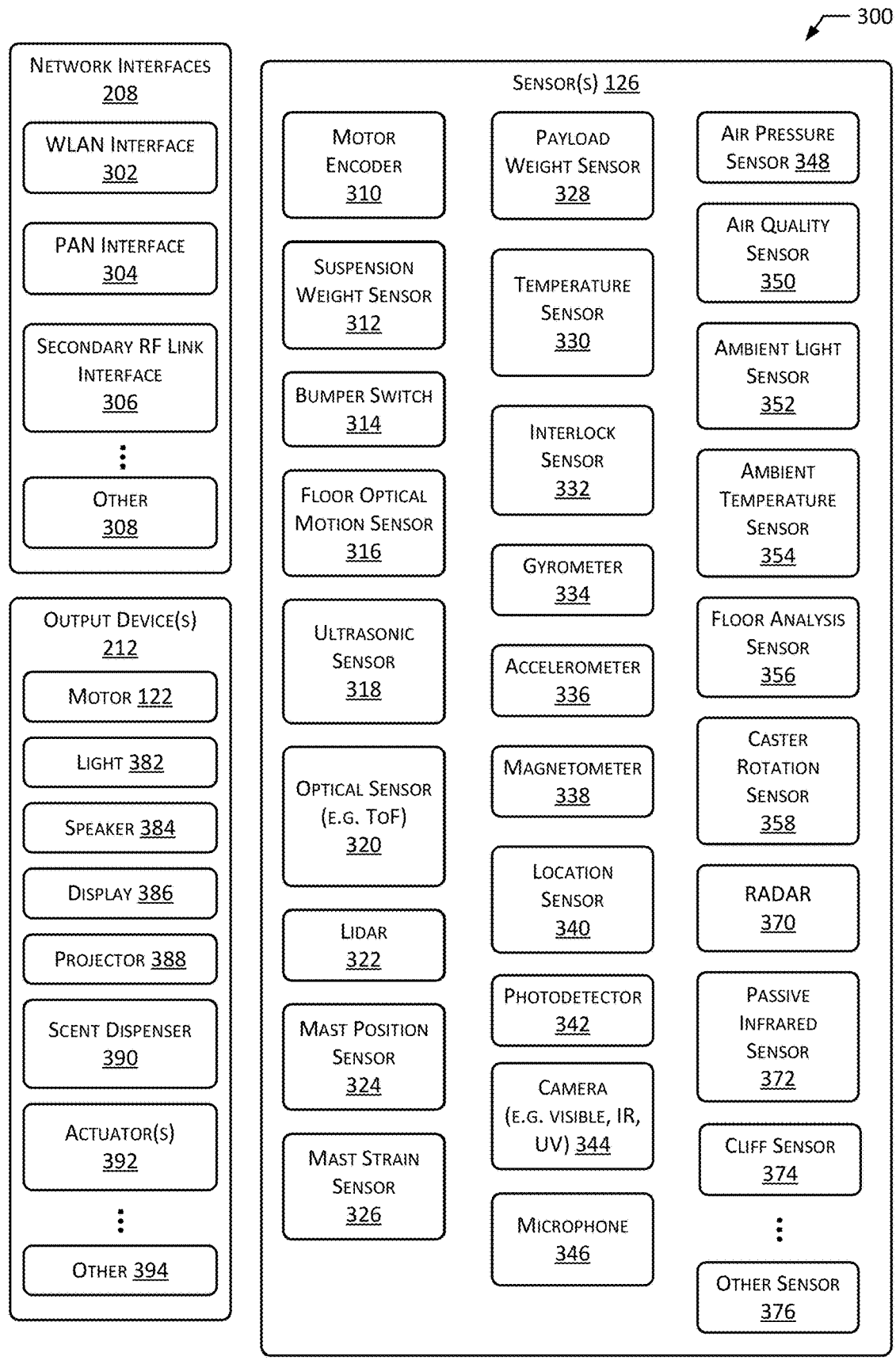
FIG. 3 is a block diagram of additional components of the AMD, according to some implementations.

FIG. 3 is a block diagram 300 of additional components of the AMD 104, according to some implementations.

The components illustrated here are provided by way of illustration and not necessarily as a limitation. For example, the AMD 104 may utilize a subset of the particular network interfaces 208, output devices 212, or sensors 126 depicted here, or may utilize components not pictured. One or more of the sensors 126, output devices 212, or a combination thereof may be included on a moveable component that may be panned, tilted, rotated, or any combination thereof with respect to a chassis of the AMD 104.

The network interfaces 208 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHZ and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHZ ISM band, within a licensed band at another frequency, and so forth. The secondary RF link interface 306 may be utilized to provide backup communication between the AMD 104 and other devices 186 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, dock 106, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 126. The sensors 126 depicted here are provided by way of illustration and not necessarily as a limitation. It is understood that other sensors 126 may be included or utilized by the AMD 104, while some sensors 126 may be omitted in some configurations.

A motor encoder 310 provides information indicative of the rotation or linear extension of a motor 122. The motor 122 may comprise a rotary motor, or a linear actuator. In some implementations, the motor encoder 310 may comprise a separate assembly such as a photodiode and encoder wheel that is affixed to the motor 122. In other implementations, the motor encoder 310 may comprise circuitry configured to drive the motor 122. For example, the navigation module 160 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 224 may use data from the suspension weight sensor 312 to determine whether or not to inhibit operation of one or more of the motors 122. For example, if the suspension weight sensor 312 indicates no weight on the suspension, the implication is that the AMD 104 is no longer resting on its wheels, and thus operation of the motors 122 may be inhibited. In another example, if the suspension weight sensor 312 indicates weight that exceeds a threshold value, the implication is that something heavy is resting on the AMD 104 and thus operation of the motors 122 may be inhibited. For example, the threshold value may comprise a weight of a load that compresses a suspension system to a minimum height, or results in a mass that exceeds a torque output of the motors 122 to maintain a minimum acceleration.

One or more bumper switches 314 provide an indication of physical contact between a bumper or other member that is in mechanical contact with the bumper switch 314. The safety module 224 utilizes sensor data 132 obtained by the bumper switches 314 to modify the operation of the AMD 104. For example, if the bumper switch 314 associated with a front of the AMD 104 is triggered, the safety module 224 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 126 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 132 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 126 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 224 and the navigation module 160 may utilize the sensor data 132 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 132 may be generated that is indicative of the presence of objects and the relative positions, shapes, and so forth that are visible to the lidar 322. Data from the lidar 322 may be used by various modules. For example, the navigation module 160 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 224. For example, if the AMD 104 is preparing to move, data from the mast position sensor 324 may be checked to determine if the mast is retracted, and if not, the mast may be retracted before to beginning movement.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 224 may utilize sensor data 132 obtained by the mast strain sensor 326. For example, if the strain applied to the mast exceeds a threshold amount, the safety module 224 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 224 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 124, one or more motors 122, and so forth. In the event the temperature exceeds a threshold value, the component associated with that device temperature sensor 330 may be shut down. For example, the threshold value may be determined based on component specifications, such as a maximum permissible temperature of the batteries 124.

One or more interlock sensors 332 may provide data to the safety module 224 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 132 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 132 indicative of impinging light. For example, the photodetector 342 may provide data indicative of a color, intensity, duration, and so forth.

A camera 344 generates sensor data 132 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data determined by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 132 comprising images being sent to the navigation module 160. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the navigation module 160 may be determined using a rolling shutter and subsequently may be processed to mitigate image artifacts.

One or more microphones 346 may be configured to determine information indicative of sound present in the physical space 102. In some implementations, arrays of microphones 346 may be used. These arrays may implement beamforming techniques to provide for directionality of gain. The AMD 104 may use the one or more microphones 346 to determine information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 224, the navigation module 160, the task module 174, and so forth. For example, if the floor analysis sensor 356 determines that the floor is wet, the safety module 224 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 126 may include a radar 370. The radar 370 may be used to provide information as to a distance, lateral position, and so forth, to an object.

The sensors 126 may include a passive infrared (PIR) sensor 372. The PIR 372 sensor may be used to detect the presence of users, pets, hotspots, and so forth. For example, the PIR sensor 372 may be configured to detect infrared radiation with wavelengths between 8 and 14 micrometers.

A cliff sensor 374 may comprise an optical sensor 320. The AMD 104 may have one or more cliff sensors 374 located on a front portion of the AMD 104. For example, the cliff sensors 374 may be time-of-flight sensors that have a field of view directed downward toward a floor over which the AMD 104 is moving towards.

The AMD 104 may include other sensors 376 as well. For example, a capacitive proximity sensor may be used to provide proximity data to adjacent objects. Other sensors 376 may include radio frequency identification (RFID) readers, near field communication (NFC) systems, coded aperture cameras, and so forth. For example, NFC tags may be placed at various points within the physical space 102 to provide landmarks for the navigation module 160. One or more touch sensors may be utilized to determine contact with a user or other objects.

The AMD 104 may include one or more output devices 212. A motor 122 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 122 with an eccentric weight may be used to create a buzz or vibration to allow the AMD 104 to simulate the purr of a cat.

FIG. 4 illustrates at 400 the exploration system 136 for the AMD 104, according to some implementations. For ease of illustration, and not necessarily as a limitation, a subset of information exchanged between modules is shown. Modules may interface using application programming interfaces (APIs), by exchanging calls, parameters, responses, and so forth. In other implementations, the functions associated with the modules may be combined, separated, or otherwise distributed. For example, in some implementations the functions of the exploration server 420 may be incorporated into the exploration manager 138.

The behavior module 134 may be used to determine whether the AMD 104 is to explore, localize, or take other action. The behavior module 134 may make this determination responsive to interactions with other modules. For example, the behavior module 134 may provide one or more application programming interfaces (API), such as an explore API 402 and a localize API 404. Another module (not shown) may use the explore API 402 to invoke an exploration of the physical space 102 or a portion thereof. Another module (not shown) may use the localize API 404 to attempt to localize the AMD 104.

The behavior module 134 is in communication with the exploration system 136. In the implementation shown, the exploration system 136 utilizes an exploration server 420. As described below, the exploration server 420 may handle communications between the exploration system 136 and the behavior module 134.

The system 100 may include a SLAM manager 470. The SLAM manager 470 may facilitate operation of one or more SLAM modules 164. In some implementations, a plurality of different SLAM algorithms as implemented by different SLAM modules 164 may be used. The SLAM manager 470 may provide information to the behavior module 134. For example, the SLAM manager 470 may determine if the SLAM module 164 is operating in a stable, minor unstable, or major unstable condition. For example, a stable condition indicates that the SLAM module 164 is able to determine localization data 166 with a minimum specified confidence. An unstable minor condition may indicate that the SLAM module 164 has degraded confidence in the localization. An unstable major condition may indicate that the SLAM module 164 is not determining localization data 166 with a confidence greater than a minimum threshold, that the SLAM module 164 has experienced an overall fault, and so forth.

In some implementations, the behavior module 134 may determine whether to perform no action, initiate exploration, or initiate localization. For example, if the AMD 104 experiences an unstable minor condition, the behavior module 134 may invoke localization to determine localization data 166. In another example, if the AMD 104 experiences a major unstable condition, the behavior module 134 may initiate exploration using the explore API 402.

The exploration server 420 may provide various functions, such as providing an interface for the behavior module 134, an interface for the map manager 172, and so forth. In some implementations, the exploration server 420 may send an instruction to the exploration manager 138 at specified time intervals. For example, the explore API 402 may receive a call to explore the physical space 102. Responsive to this, the behavior module 134 sends an instruction to the exploration server 420. Responsive to this instruction, the exploration server 420 initiates a worker thread. In one implementation, the worker thread may be executed on a recurring loop at a specified time interval, such as every second. This recurrence and subsequent operation of the exploration manager 138 allows the system 100 to be responsive to changes, improving outcome of the exploration. In other implementations the worker thread may be executed responsive to a trigger or occurrence of an event.

During execution, the worker thread sends instructions to the exploration manager 138 to perform an exploration operation. The worker thread may then process results from the exploration manager 138. For example, after the exploration manager 138 reports successful completion of exploration, the exploration server 420 may save the map data 190 for later use and send a message to the behavior module 134 that the exploration is complete.

In the implementation depicted, the SLAM module 164 provides as output SLAM data 490. The SLAM data 490 may comprise the localization data 166. The localization data 166 may comprise the pose data 168 and associated confidence data 472. In one implementation, each pose indicated by the pose data 168 may have respective confidence data 472. The confidence data 472 may be indicative of a confidence in the associated pose data 168. For example, a high confidence pose may be deemed likely to be accurate, while a low confidence pose may be deemed likely to be inaccurate. In another implementation, confidence data 472 may be associated with a plurality of poses indicated by the pose data 168.

The SLAM data 490 may also comprise a pose graph 492. The pose graph 492 may comprise keyframe data 494 and a view score 496 associated with the keyframe data 494. The view score 496 is a metric that is indicative of the features in a given keyframe. For example, the view score 496 may comprise or be based on data indicative of a count of features that are associated with the pose data 168, density of features associated with the pose data 168, and so forth. For example, keyframe data 494 may comprise an image (e.g. "keyframe"), associated with the pose data 168, that comprises one or more features usable by the SLAM module 164 for localization. In another example, the keyframe data 494 may comprise descriptors determined from the image acquired while at the pose indicated by the pose data 168. A keyframe that is associated with a greater view score 496 may have a greater likelihood of producing localization data 166 at a later time.

The exploration manager 138 may determine world snapshot data 430. The world snapshot data 430 is representative of the AMD 104 with respect to the physical space 102. The world snapshot data 430 may be based on, or comprise, at least a portion of the SLAM data 490. For example, the world snapshot data 430 may comprise the pose graph 492. In another example, the world snapshot data 430 may comprise pose data 168 that is indicative of a set of poses of the AMD 104 and confidence data 472 associated with those poses. For example, the world snapshot data 430 may comprise a particular pose indicative of a particular location and orientation of the AMD 104 in the physical space 102 at a particular time. The world snapshot data 430 may be updated to include information obtained since a last iteration. For example, if the SLAM module 164 is providing SLAM data 490 at a one hertz refresh rate, the world snapshot data 430 may comprise the localization data 166, pose graph 492, and so forth acquired in the previous second. The world snapshot data 430 may comprise or be based on other information. The world snapshot data 430 is discussed in more detail with regard to FIG. 5.

Exploration by the AMD 104 may involve more than one excursion in the physical space 102. For example, during a first stage of exploration, the AMD 104 may perform several passes including moving from the dock 106 to a first room, then to a second room, return to the dock 106, move to a third room, and so forth. The voyage data 432 may comprise information indicative of whether a set of excursions are associated. For example, the AMD 104 may be moved between two different floors of a building. The voyage data 432 may be used to maintain a distinction between these floors, by having a first voyage for the first floor and a second voyage for the second floor. In another example, the AMD 104 may determine whether an ongoing exploration is in progress, with that ongoing exploration designated as a "voyage". A voyage may be deemed to be complete when exploration has been deemed complete. In one implementation, a voyage may correspond to a specific call to the explore API 402. For example, a first call to the explore API 402 may result in a first voyage, a second call to the explore API 402 may result in a second voyage, and so forth. In another implementation, one voyage may be distinguished from another based on a failure. For example, a failure may result in determining that a first voyage has concluded, and a second voyage has begun. A failure may be one or more of the AMD 104 being picked up, tipped over, turned off, a count of planner failures exceeds a threshold value, a failure reported by the SLAM module 164, available battery power being less than a threshold value, the physical space is too large for available computational resources, hardware failure, and so forth. In some implementations, the failure may be representative of a difference between first localization data 166 that is associated with a first time and second localization data 166 that is associated with a second time. If that difference exceeds a threshold value, a failure may be deemed to have occurred. For example, first pose data 168(1) indicates that the AMD 104 is at the front door of a house at time t=1 second. Continuing the example, the second pose data 168(2) indicates that the AMD 104 is at the back door of the house at time t=2 seconds, associated with a physical displacement of 17 meters in one second. If the threshold value is 1 meter, a failure is deemed to have occurred and a voyage may be concluded.

Exploration may be deemed complete based on one or more criteria. For example, exploration may be deemed complete if the occupancy map data 194 indicates no unexplored areas, all planner modules 140 provide responses indicative of "no further plan data", and so forth.

The exploration manager 138 may comprise a plan selection module 434 that interacts with a plurality of planner modules 140(1), 140(2), . . . , 140(P). The plan selection module 434 determines one or more of the planner modules 140 and sends one or more request(s) 436 to those one or more determined planner modules 140.

Requests 436 are made to the planner modules 140 in the order indicated by the hierarchy. For example, a request 436(2) may be sent to a second planner module 140(2) after a specified response 460(1) from a first planner module 140(1) is received. Continuing the example, the specified response may be an indication that the first planner module 140(1) "has no further plan data to execute". In this fashion, the hierarchy may specify that particular planner modules 140 are to be used before others.

Each planner module 140 comprises a particular planning algorithm to explore the physical space 102. Different planner modules 140, and their associated planning algorithms, may be specialized to operate under different conditions. These conditions may include, but are not limited to, environmental, operational, temporal, and so forth. For example, environmental conditions may include ambient light level, ambient noise level associated with one or more sensors 126, temperature, and so forth. In another example, operational conditions may comprise an inoperative sensor 126, sensor data 132 that is deemed unreliable, reduced compute resources due to other higher priority tasks being executed, and so forth. In another example, temporal conditions may comprise time limits associated with operation such as having only 45 minutes during a lunch break during which the physical space 102 is unoccupied by users.

The request 436 may include at least the world snapshot data 430. The request 436 may comprise addressing data that specifies one or more planner modules 140 that are to respond to the request 436. In one implementation, a separate request 436 may be addressed to a specific planner module 140 and sent to that specific planner module 140 at a given time. In another implementation, a single request 436 may be addressed to a specified plurality of planner modules 140 and sent to those planner modules 140 at the given time.

In some implementations, the request 436 may comprise voyage data 432. For example, the request 436 may include a voyage identifier 560.

Responsive to the request 436, a planner module 140 associated with the request 436 determines a response 460 and may determine plan data 142. The planner module 140 may use as input the world snapshot data 430. In some implementations, the planner module 140 may use as input other information, such as map data 190, lighthouse data 442, and so forth. The planner module 140 may operate to consider the available information about the physical space 102 in its entirety, or on a "global" level. Each planning algorithm of the set of planning algorithms may accept as input all data about the physical space 102 that is available at execution of each planning algorithm of the planner module 140 that implements the planning algorithm. Said another way, each planning algorithm of the set of planning algorithms may accept as input all pose graph data about the physical space 102 that is available at execution of the each planning algorithm. For example, each planner module 140 may accept as input and process the entire pose data 168, entire map data 190, and so forth, that is available at a time of execution. A particular planner module 140 may implement a planning algorithm that operates on a particular subset of that data. For example, a planner module 140(83) may determine plan data 142 with respect to doorways. Continuing this example, the global level would result in processing of all currently known doorways. In contrast, a "local" level would process only a "closest doorway".

Each planner module 140 may have an associated planner state 450. For example, the planner state 450 may comprise initialization values. In some implementations, the planner state 450 may persist across subsequent executions of the particular planner module 140. For example, the planner state 450 may store values from a previous execution of the associated planner module 140 during a specified voyage. During operation, the planner module 140 may utilize the planner state 450. For example, the planner state 450 may comprise previously determined plan data 142 associated with a current voyage.

The response 460 by the planner module 140 may indicate output of the operation of the planner module 140. For example, the response 460 may indicate one of: new plan data 142 has been determined, previously determined plan data 142 is to be executed, no further plan data 142 is determined, or a failure of the planner module 140 has occurred. In some implementations, a response 460 indicative of "no further plan data 142 is determined" may be deemed to be successful completion of the associated planner module 140.

The one or more responses 460 and associated plan data 142 (if any) resulting from the one or more requests 436 may be provided to the plan selection module 434. The plan selection module 434 may then receive the response(s) 460 and plan data 142, if any. The plan selection module 434 determines the plan data 142 that is to be executed. In one implementation, the plan selection module 434 may select the plan based on relative ranking in the hierarchy of the planner modules 140. For example, first plan data 142(1) determined by the planner module 140(1) may supersede second plan data 142(2) determined by the planner module 140(2). In this fashion, the plan selection module 434 may permit preemption by a higher ranked planner module 140. For example, the loop closure planner 140(2) (discussed below) may preempt a final motion planner 140(5).

The plan selection module 434 may determine the plan data 142 to be executed based on other information. For example, if the ambient light level determined by the ambient light sensor 352 is deemed "dark", a planner module 140 may be selected that is designed for low light use, such as relying on features visible to an infrared camera or using features with higher contrast in image data. In another implementation, if the localization data 166 indicates confidence data 472 below a threshold value, plan data 142 associated with a planner module 140 comprising a planning algorithm to perform a loop closure process may be selected for execution.

The exploration manager 138 may comprise an execution manager 462. The execution manager 462 accepts as input the plan data 142 that has been determined for execution by the plan selection module 434. The plan data 142 may comprise instructions to operate the AMD 104. The plan data 142 may be simple instructions or complex sets of instructions associated with complex operations. The plan data 142 is discussed in more detail with regard to FIG. 5.

In some implementations the plan data 142 may comprise, or may be used by, the execution manager 462 to determine the movement messages 150. The movement messages 150 may comprise instructions to operate the AMD 104 to perform particular movements. The movement messages 150 may be provided to the navigation module 160. The navigation module 160 may process the movement messages 150 or other plan data 142 and operate the AMD 104 to implement one or more movements of the AMD 104. For example, the movement message 150 may be "go to previously stored pose 902". Responsive to this, the navigation module 160 may attempt to move the AMD 104 to the previously stored pose designated as "902". The navigation module 160 may use the occupancy map data 194, as available.

The lighthouse data 442 is indicative of one or more poses that have been determined to be suitable for use by the SLAM module 164 for localization, loop closure, and so forth. In some implementations, the lighthouse data 442 may comprise one or more of feature data 192, keyframe data 494, and so forth. A lighthouse module 440 may determine lighthouse data 442 during exploration. For example, as the AMD 104 explores the physical space 102, pose data 168 is acquired indicative of a pose. A pose that has a number of SLAM features that exceeds a threshold value, is high confidence data 472, or other criteria may be specified as a "lighthouse" and stored as lighthouse data 442. During exploration or non-exploration operation, the AMD 104 may attempt to move to a pose specified in the lighthouse data 442 to resolve a failure in localization, provide calibration for other modules, and so forth. The lighthouse data 442 is discussed in more detail with regard to FIG. 5.

The exploration server 420 may provide result data 498 to the behavior module 134. For example, the result data 498 may indicate that the map data 190 is deemed sufficient for the AMD 104 to begin performing non-exploration related tasks.

The modularity of the exploration system 136 provides a framework with the benefits of modular construction. As changes take place with regard to use case, development, hardware, physical space, and so forth, the system 100 may be readily adjusted. For example, an AMD 104 that has access to high precision localization data, such as from a global positioning system (GPS), may omit the SLAM module 164 and the lighthouse module 440 in favor of the data from the GPS. In another example, an AMD 104 operating in a warehouse with unique visible location tags visible in all areas may omit the lighthouse module 440.

This flexibility is particularly apparent with regard to the operation of the exploration manager 138 and in the set of planner modules 140 that are available for operation. The logic to select a particular planner module 140 by the exploration manager 138 may be readily updated without requiring changes to other modules, other than an awareness of which planner modules 140 are available for use. Once selected, the planner module 140 may generate the plan data 142.

The planner modules 140 available may provide various functionality. A planner module 140(1) ("initial motion planner 140(1)") may comprise a planning algorithm to explore an area in the physical space 102 for which no previous knowledge is available. For example, the exploration manager 138 may select the initial motion planner 140(1) when no occupancy map data 194 is available, a new voyage has been initiated, if localization data 166 is unavailable, and so forth. During operation, the initial motion planner 140(1) may generate plan data 142 to remain in place while using the sensors 126 to acquire sensor data 132. Continuing, the plan data 142 may then include a slow movement into areas that have been deemed free of obstacles 108, to obtain sensor data 132 from a different pose.

A planner module 140(2) ("loop closure planner 140(2)") may comprise a planning algorithm to determine a third location in the physical space 102 that is suitable for use during loop closure by the SLAM module 164. For example, the loop closure planner 140(2) may determine plan data 142 to move the AMD 104 in loops so that it crosses its own previous path, to increase the confidence data 472 associated with localization data 166. In another example, the loop closure planner 140(2) may determine plan data 142 that moves the AMD 104 to a specified lighthouse as indicated by the lighthouse data 442. Upon arrival, the AMD 104 may rotate in one or more directions. If loop closure does not complete successfully, the AMD 104 may perform other movements such as moving to another nearby lighthouse, and so forth. The system 100 may include a plurality of loop closure planner modules 140(2).

A planner module 140(3) ("feature coverage planner 140(3)") may comprise a planning algorithm to determine a location that is deemed to be associated with a high likelihood of having sufficient features in resulting sensor data 132 to be suitable for success of a loop closure operation by a SLAM algorithm used by the SLAM module 164. Operation of the feature coverage planner 140(3) may preempt plan data 142 that are associated with lower priority planner modules 140.

In one implementation, the feature coverage planner 140 (3) may assess SLAM data 490 while the AMD 104 moves through the physical space 102. For example, if the SLAM data 490 indicates that, for a particular pose, the count of features visible from that pose exceeds a threshold and the density of those features exceeds a threshold, the feature coverage planner 140(3) may determine plan data 142 to move the AMD 104 to obtain sensor data 132 in all directions. Continuing the example, the AMD 104 may be directed to turn in a tight circle or stop and turn 360 degrees, to acquire sensor data 132 from which features are suitable for use by the SLAM module 164. The movement of the AMD 104, during which the location is determined, may result from plan data 142 determined by other planner modules 140.

In another implementation, the feature coverage planner 140(3) may affirmatively direct the AMD 104 to move to a particular location. For example, the feature coverage planner 140(3) may select a location such as a doorway between rooms and generate plan data 142 comprising instructions to move to that location and then operate the sensors 126 to acquire sensor data 132.

In some implementations, the feature coverage planner 140(3) may move the AMD 104 within constraints that are selected to maximize the acquisition of sensor data 132 that may result in loop closure. For example, the feature coverage planner 140(3) may move the AMD 104 at a maximum speed of 0.5 meters, instruct the AMD 104 to stop and perform a complete 360 degree turn every 2 meters, and so forth, where possible maintain a minimum distance from an obstacle to maximize sensor view of a scene, and so forth.

The location determined by the feature coverage planner 140(3) may remain a "candidate" loop closure location until later validated. For example, this validation may comprise navigating to the candidate loop closure location, returning to another loop closure location, and successfully completing loop closure. The feature coverage planner 140(3) may limit creation of candidate loop closure locations based on distance from existing loop closure locations, view score 496, or other metrics. In some implementations the validated loop closure locations may be stored as lighthouse data 442.

A planner module 140(4) ("frontier planner 140(4)") may comprise a planning algorithm to determine instructions to move the AMD 104 to a second location in the physical space 102 that is within sensor range of a previously unexplored area in the physical space 102. For example, during a voyage, an exploration map 502 (see FIG. 5) may be maintained. The exploration frontier map may be based on the occupancy map data 194 gathered to that point in time, and is indicative of where a frontier is. Continuing the example, the frontier may be specified as a boundary between explored areas and unexplored areas. In this example, explored areas are those for which sensor data 132 has been acquired, while unexplored areas are those for which sensor data 132 has not been acquired or for which the sensor data 132 was deemed unreliable or contradictory. The frontier planner 140(4) may determine plan data 142 to move the AMD 104 to a pose that is on or near the frontier, to allow the AMD 104 to acquire sensor data 132 about the previously unexplored area, resulting in that becoming explored area.

A planner module 140(5) ("final motion planner 140(5)") (not shown) may comprise a planning algorithm that determines instructions to move the AMD 104 to a previously stored fourth location in the physical space 102 that is associated with a beginning of exploration of the physical space 102. For example, if the AMD 104 began exploration at the dock 106 it may return to the dock. In some implementations, this may serve as a final check to confirm the validity of the feature data 192 and the occupancy map data 194 and confirm the localization data obtained. Continuing the example, the AMD 104 may select an indirect route to return to the dock 106, requiring the AMD 104 to navigate through more of the physical space 102 before returning to the dock 106. This may include ongoing localization using the feature data 192.

Other planner modules 140(P) may also be used. A local region discovery planner module 140(6) may be configured to determine boundaries of local regions in the map data 190, such as rooms. The boundary may also include information about entry/exit points, such as doors, for those regions. A joint optimizing planner module 140(7) may optimize multiple cost functions to create plan data 142 that accomplishes multiple goals. A reflective surface planner module 140(8) may be configured to determine the presence and location of reflective surfaces such as mirrors, windows, glossy surfaces, and so forth.

In some implementations, a hierarchy of execution of the planner modules 140 may be specified. For example, an initial motion planner module 140 may be required to complete before executing a final motion planner module 140.

In some implementations, the exploration manager 138 may use the plan data 142 to operate the AMD 104. For example, the exploration manager 138 may receive the plan data 142, determine movement messages 150 based on the received plan data 142, and so forth.

In some implementations, the planner modules 140 may be remotely executed. For example, one or more planner modules 140 may execute at least in part on the servers 184.

The map manager 172 may be in communication with the exploration system 136. In the implementation shown, the exploration server 420 may communicate with the map manager 172. For example, the exploration server 420 may receive a message from the exploration manager 138 that exploration has been successfully completed. Responsive to this, the exploration server 420 may send a "save map request" to the map manager 172. Responsive to the "save map request", the map manager 172 may save the current occupancy map data 194 for later use.

The exploration server 420 may query the map manager 172 for information regarding previously stored occupancy map data 194. Responsive to the resulting data, the exploration server 420 may invoke the exploration manager 138 to begin exploration. For example, if the result from the map manager 172 indicates that previously stored occupancy map data 194 is past a specified expiration time, exploration may be initiated. Continuing the example, occupancy map data 194 that is more than 48 hours old may be deemed to have expired.

In some implementations, the exploration server 420 may invoke the exploration manager 138 as a result of time, environment, and so forth. For example, a day may be broken up into various periods that are associated with a solar day, such as morning, noon, afternoon, and evening. Due to changes in lighting as the sun rises, transits the sky, and sets, the exploration server 420 may invoke exploration if no prior data is available for that period. Continuing the example, if exploration has not yet taken place during the 3 pm to 7 pm period designated as "afternoon", exploration may be invoked. This allows the AMD 104 to accommodate changes due to variations in lighting, usage at different times of day, and so forth.

Figure 5:
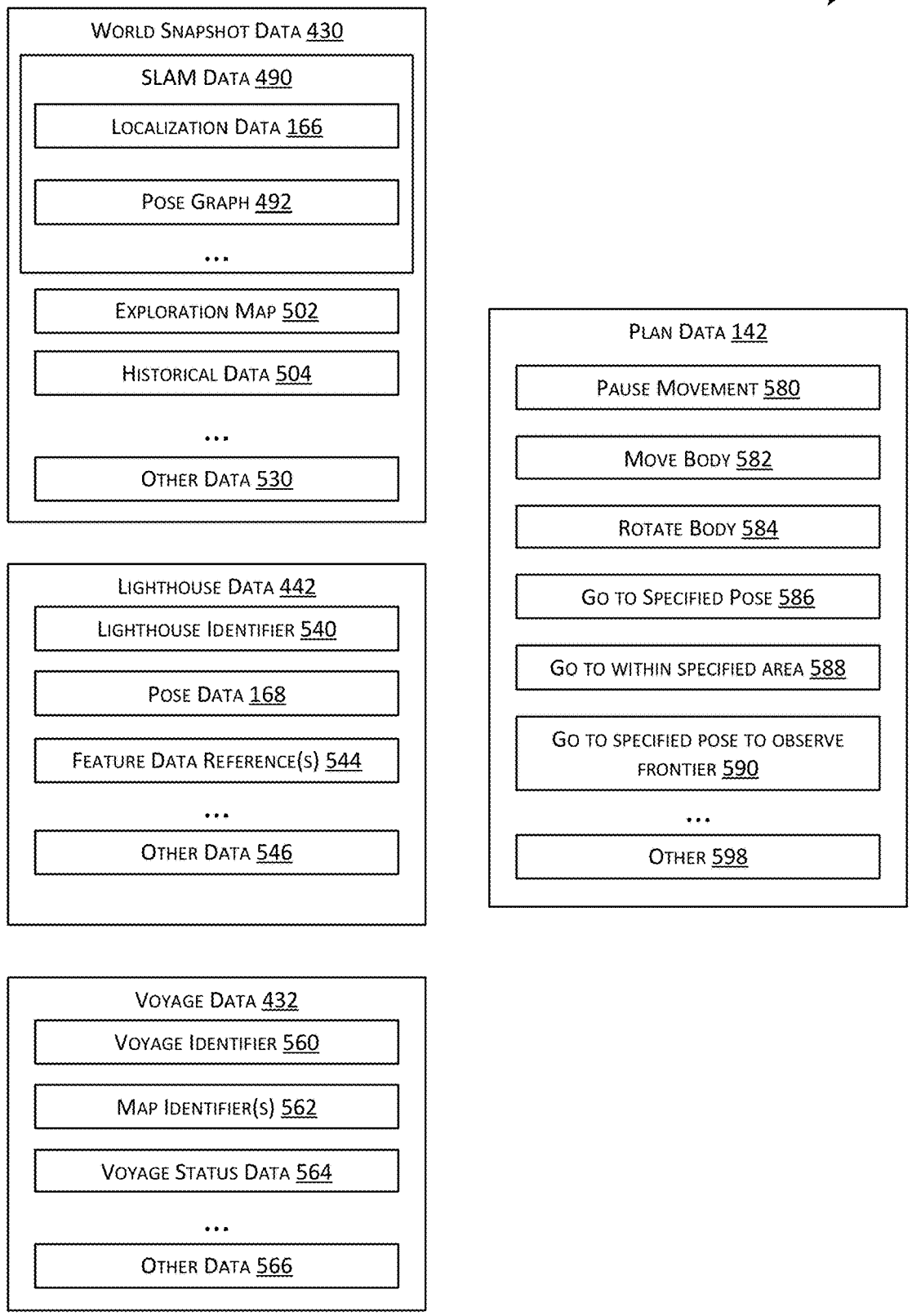
FIG. 5 illustrates data associated with operation of the exploration system, according to some implementations.

FIG. 5 illustrates at 500 data associated with operation of the exploration system 136, according to some implementations.

The world snapshot data 430 is shown. The world snapshot data 430 may comprise SLAM data 490 such as one or more of localization data 166 a pose graph 492, and so forth. In one implementation, the data in the SLAM data 490 may be limited to that obtained since a previous iteration of the exploration manager 138, for a specified voyage identifier 560, and so forth. The world snapshot data 430 may include an exploration map 502.

The exploration map 502 may be based on the occupancy map data 194 gathered to that point in time. In some implementations, the exploration map 502 may comprise a subset of the occupancy map data 194, may be indicative of where a frontier is in the physical space 102, and so forth. The frontier may be specified as a boundary between explored areas and unexplored areas.

The world snapshot data 430 may include historical data 504. For example, the historical data 504 may comprise a history of plan data 142 determined by the planner module(s) 140, history of plan data 142 that has been executed by the execution manager 462, and so forth. In some implementations, at least a portion of the historical data 504 may comprise the planner state 450. For example, the planner state 450 may be used to maintain a history of plan data 142 determined by a respective planner module 140.

The world snapshot data 430 may include other data 530 as well.

The lighthouse data 442 may comprise a lighthouse identifier 540 that specifies a particular pose or "lighthouse". The lighthouse data 442 may also comprise pose data 168 and feature data 192 that is associated with the pose. For example, the feature data 192 may comprise at least some of the features that were previously determined by the SLAM module 164 while at that pose. In some implementations, the feature data 192 may comprise keyframe data 494. In other implementations, the feature data 192 may be based on keyframe data 494. For example, a keyframe may be processed to determine feature data 192. The lighthouse data 442 may include other data 546. For example, the other data 546 may include a timestamp, designation of which period of the day the feature data 192 was obtained at, and so forth.

The voyage data 432 may comprise a voyage identifier 560 that specifies a particular voyage. The voyage data 432 may include one or more map identifiers 562. A map identifier 562 may specify a particular occupancy map data 194. The voyage data 432 may also comprise voyage status data 564. For example, the voyage status data 564 may indicate a time when the voyage began, if the voyage has concluded successfully, if the voyage is in progress, if the voyage concluded unsuccessfully, a time when the voyage completed if it did, and so forth. The voyage data 432 may include other data 566 as well.

The plan data 142 may comprise one or more instructions that, when executed, operate the AMD 104. The instructions or sets of instructions shown in the plan data 142 are shown by way of illustration, and not necessarily as a limitation.

The plan data 142 may comprise a pause movement 580 plan that directs the AMD 104 to remain in the current location without moving. In some situations, it may be advantageous for the AMD 104 to not move. For example, while processing previously acquired sensor data 132, the AMD 104 may hold still. In another example, the pause movement 580 may be used to acquire sensor data 132 about a variable scene or phenomena, such as drapes billowing in the breeze, a moving door, and so forth.

A move body 582 plan may move the AMD 104 in a specified direction, such as translating forward or backward, by a specified distance.

A rotate body 584 plan may rotate the AMD 104 in a specified direction, such as left or right, by a specified angular measure.

A go to specified pose 586 plan may direct the AMD 104 to move to the specified pose.

A go to within specified area 588 plan may direct the AMD 104 to move to or within a boundary of a specified area. For example, the AMD 104 may be directed to go to a particular room, but the specific pose within the room is not specified.

A go to specified pose to observe frontier 590 plan may direct the AMD 104 to move to the specified pose and direct the sensors 126 such that their field of view is acquiring sensor data 132 about the unexplored area past the frontier.

Other 598 plans may also be present. For example, a plan may specify a pose the AMD 104 is to move to, where sensor data 132 may be obtained. The sensor data 132 may be processed, and the output compared to previously stored data to validate the previously stored data. Continuing the example, the feature data 192 for a particular pose may be checked against previously stored feature data 192 to validate the accuracy and repeatability of the previously stored feature data 192.

The plan data 142 described in a plan for exploration may include one or more of the plans described in various combinations, orders, and so forth. For example, the plan data 142 may indicate move body 582 by 1.5 meters forward, rotate body 584 to the right 45 degrees, and so forth.

Figure 6:
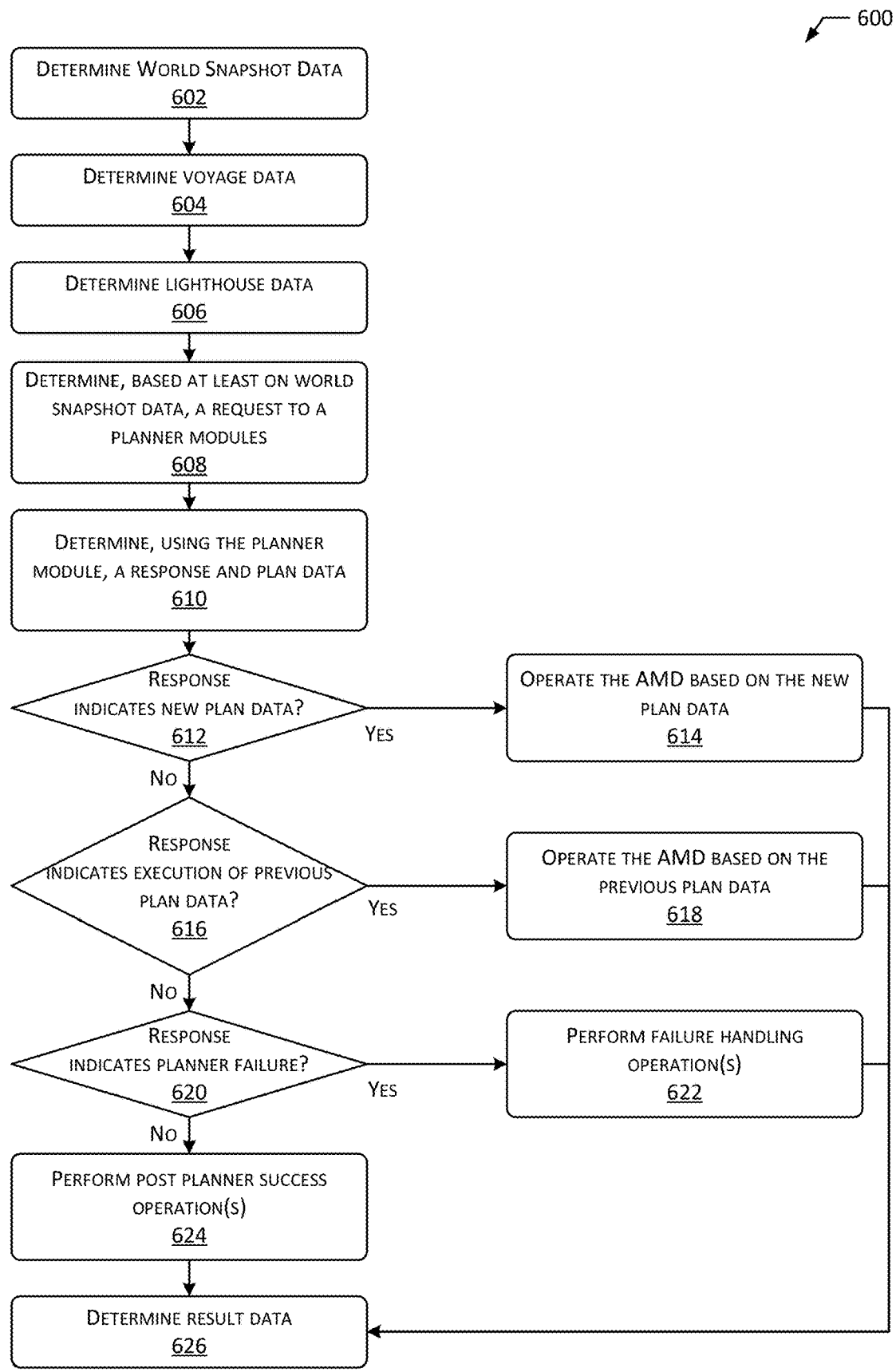
FIG. 6 illustrates a flow diagram of a process to operate the exploration system, according to some implementations.

FIG. 6 illustrates a flow diagram 600 of a process to operate the exploration system 136, according to some implementations. The process may be implemented at least in part by the one or more processors 120 of the AMD 104.

At 602 world snapshot data 430 is determined. For example, the exploration manager 138 may use the localization data 166, determine the exploration map 502, feature data 192, and so forth.

At 604 voyage data 432 is determined. For example, if the exploration system 136 is utilizing voyages, the voyage data 432 may be retrieved.

At 606 lighthouse data 442 is determined. For example, lighthouse data 442 that is associated with the current location as indicated by the pose data 168 in the localization data 166 may be determined.

At 608, based at least on world snapshot data 430, the plan selection module 434 determines a request 436 to at least one planner module 140. For example, the plan selection module 434 may determine a request 436 to planner module 140(1).

The request(s) 436 may also be based on one or more of the voyage data 432, the lighthouse data 442, map data 190, and so forth. In one implementation, the plan selection module 434 may execute selection logic to determine which planner module 140 to send a request 436 to. For example, if the confidence data 472 is below a first threshold, the loop closure planner module 140(3) may be selected. In another example, if the confidence data 472 is greater than a second threshold, and the initial motion planner module 140(1) has sent a response 460 of "no further plan data to execute", the frontier planner module 140(2) may be selected. In some situations, it may be necessary to delay further exploration until processing of data acquired responsive to previous plan data 142 is complete. In these situations, the pause movement 580 plan may be used to provide additional time for that processing to complete.

The logic implemented at 608 may vary based on the planner modules 140 available. One example of logic to determine the planner selection data 434 is shown in code example 1:

```
ExplorationManager::pickPlanner( ) {
  if (world_state.getCurrentLocalizationConfidence( )<M-
    IN_SAFE_LOCALIZATION_CONFIDENCE)
    {selected_planner=loop_closure_planner;
  }
  else if (selected_planner_last_planning_cycle_ == loop_
    closure_planner && world_state.getCurrentLocaliza-
    tionConfidence( )<MIN_CONFIDENCE_TO_EN-
    D_ACTIVE_LOOP_CLOSURE) {selected_planner=
    loop_closure_planner;
  }
  else if (!initial_motion_planner.isComplete ( )) {selected_
    planner=initial_motion_planner;
  }
  else if (!frontier_based_planner.isComplete ( )) {selec-
    ted_planner=frontier_based_planner;
  } else {
  // exploration is complete—no planner needs to run
    selected_planner=null;
  }
  selected_planner_last_planning_cycle_=selected_planner;
  return selected_planner;
}
```

Code Example 1

At 610, responsive to the request 436, the planner module 140(1) determines a response 460 and may determine plan data 142. For example, responsive to the request 436, the selected planner module 140 is executed. Once executed, the selected planner module 140 may determine plan data 142. In some circumstances, no plan data 142 may be determined by the planner module 140. For example, the planner module 140 may determine no further actions are needed. In another example, the planner module 140 may experience a failure.

At 612 a determination is made as to whether the response 460 is indicative of new plan data 142. If yes, the process proceeds to 614. If no, the process proceeds to 616. For example, new plan data 142 may be new if it differs from previously determined plan data 142. At 614 the AMD 104 is operated based on the new plan data 142. For example, the AMD 104 may pause, move to a specified pose, and so forth, as indicated in the new plan data 142. After 614 the process may proceed to 626.

Returning to 612, if the response 460 from the planner module 140 indicates that the plan data 142 is not new, the process proceeds to 616.

At 616 a determination is made as to whether the plan data 142 indicated by the response 460 is indicative of execution of previous plan data 142. If yes, the process proceeds to 618. If no, the process proceeds to 620. At 618, the AMD 104 is operated based on the previous plan data 142. After 618 the process may proceed to 626.

At 620 a determination is made as to whether the response 460 from the planner module 140 is indicative of a failure. If yes, the process proceeds to 622. If no, the process proceeds to 624.

At 622 one or more failure handling operations are performed. For example, if the AMD 104 is deemed to be at a location that is unable to reach the dock 106 (also known as "marooned"), one or more submaps describing the physical space 102 may be deleted. In another example, the AMD 104 may issue a request for user assistance. After 622 the process may proceed to 626.

At 624 one or more post planner success operations are performed. For example, upon success of a specified set of planner modules 140, a final check of the map data 190 may be performed. For example, this final check may comprise assessing the occupancy map data 194 to determine that there are no topological inconsistencies.

At 626 result data 498 is determined. For example, the result data 498 may indicate the success, failure, state, or other information associated with execution of the exploration system 136.

The exploration system 136 may utilize one or more stages, each stage having one or more passes, to determine feature data 192, occupancy map data 194, and so forth. A stage may comprise a specified set of one or more planner modules 140 for use. Exploration may include a plurality of stages, with each stage comprising a different set of one or more planner modules 140. Some planner modules 140 may be used in more than one stage. By dividing the exploration into these stages and passes, overall performance of the exploration is improved. Each stage, and respective passes, allows for planner modules 140 suitable for that stage to be used to quickly and efficiently acquire information about the physical space 102. Successive stages and passes may be used to acquire particular information, such as exploring previously unexplored areas, gathering additional feature data 192 to facilitate localization at a later time, and so forth.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

In other implementations, other types of autonomous mobile devices (AMDs) may use the systems and techniques described herein. For example, the AMD 104 may comprise an autonomous ground vehicle that is moving on a street, an autonomous aerial vehicle in the air, autonomous marine vehicle, and so forth.

What is claimed is:

1. An autonomous mobile device (AMD) comprising:
    one or more sensors that acquire data about a physical space;
    one or more memories storing computer-executable instructions; and
    one or more processors to execute the computer-executable instructions to:
        determine first data using the one or more sensors;
        determine, based on the first data, second data that is representative of the AMD with respect to the physical space;
        initiate exploration of the physical space, wherein the exploration comprises a first pass of the physical space and a second pass of the physical space;
        determine, using the second data and a first planning algorithm, first plan data indicative of the first pass of the physical space;
        perform the first pass by operating the AMD based on the first plan data;
        determine third data using the one or more sensors;
        determine, based on the second data and the third data, fourth data that is representative of the AMD with respect to the physical space;
        determine, using the fourth data and the first planning algorithm, a first response that indicates no further plan by the first planning algorithm;
        determine, using the fourth data and a second planning algorithm, second plan data indicative of the second pass of the physical space; and
        perform the second pass by operating the AMD based on the second plan data.

2. The AMD of claim 1, wherein the second data comprises one or more poses, wherein each pose of the one or more poses is:
    indicative of a respective location with respect to the physical space;
    indicative of a respective orientation with respect to the physical space; and
    is associated with keyframe data acquired at the respective location and in the respective orientation, wherein the keyframe data is indicative of one or more features associated with operation of a simultaneous localization and mapping (SLAM) algorithm.

3. The AMD of claim 1, wherein the one or more processors further execute the computer-executable instructions to:
    determine a set of planning algorithms comprising the first planning algorithm and the second planning algorithm, wherein each planning algorithm of the set of planning algorithms accepts as input all data about the physical space that is available at execution of the each planning algorithm.

4. The AMD of claim 1, wherein the one or more processors further execute the computer-executable instructions to:
  determine a set of planning algorithms comprising the first planning algorithm and the second planning algorithm;
  determine, during execution of instructions to operate the AMD based on the second plan data, fifth data using the one or more sensors; and
  determine, based on one or more of the first data, the third data, or the fifth data, map data comprising:
    feature data that is indicative of one or more features of the physical space that are associated with operation of a simultaneous localization and mapping (SLAM) algorithm; and
    occupancy map data that is indicative of locations of one or more obstacles in the physical space; and
  wherein at least a portion of the map data is input to each planning algorithm of the set of planning algorithms.

5. The AMD of claim 1, wherein the one or more processors further execute the computer-executable instructions to:
  determine, during execution of instructions to operate the AMD based on the second plan data, fifth data using the one or more sensors;
  determine, based on the first data, the third data, and the fifth data, map data that is representative of at least a portion of the physical space;
  determine a first location of the AMD in the physical space;
  determine a second location in the physical space;
  determine, based on the map data, third path plan data indicative of a path from the first location to the second location; and
  operate the AMD based on the third path plan data.

6. The AMD of claim 1, wherein the one or more processors further execute the computer-executable instructions to:
  determine, during execution of instructions to operate the AMD based on the second plan data, fifth data using the one or more sensors;
  determine, based on the fourth data and the fifth data, sixth data that is representative of the AMD with respect to the physical space;
  determine, based on the sixth data and the second planning algorithm, a second response, wherein the second response is indicative of no further plan by the second planning algorithm;
  determine, based on the sixth data and a third planning algorithm, third plan data; and
  operate the AMD based on the third plan data.

7. The AMD of claim 1, wherein the one or more processors further execute the computer-executable instructions to:
  determine a set of planning algorithms;
  wherein the set of planning algorithms comprise one or more of:
    the first planning algorithm that causes the AMD to explore an area in the physical space for which no previous knowledge is available;
    the second planning algorithm that causes the AMD to:
      determine a previously stored first location in the physical space that is associated with loop closure;
      move the AMD to the first location; and
      perform, at the first location, a loop closure operation;
    a third planning algorithm that causes the AMD to determine that a current location of the AMD in the physical space is a candidate for loop closure;
    a fourth planning algorithm that causes the AMD to move to a third location in the physical space, wherein the third location is associated with a frontier of a previously unexplored area of the physical space; or
    a fifth planning algorithm that causes the AMD to move to a previously stored fourth location in the physical space, the fourth location being associated with a beginning of exploration of the physical space.

8. The AMD of claim 1, wherein the first plan data comprises one or more of:
  a first instruction to pause movement of the AMD for a duration of time;
  a second instruction to rotate the AMD;
  a third instruction to move the AMD to a first pose, wherein the first pose is associated with a particular location in the physical space and a particular orientation of the AMD;
  a fourth instruction to move the AMD to a first location that is within a first area of the physical space; or
  a fifth instruction to operate the one or more sensors.

9. The AMD of claim 1, wherein each response by a planning algorithm of a set of planning algorithms is indicative of one of:
  new plan data that has been determined for execution,
  continuation of execution of previously determined plan data,
  no further plan data, or
  failure data.

10. A method comprising:
  determining first data about a physical space using one or more sensors of an autonomous mobile device (AMD);
  determining, based on the first data, second data that is representative of the AMD with respect to the physical space;
  initiating exploration of the physical space, wherein the exploration comprises a first pass of the physical space and a second pass of the physical space;
  determining, using the second data and a first planning algorithm, first plan data indicative of the first pass of the physical space;
  performing the first pass by operating the AMD based on the first plan data;
  determining third data using the one or more sensors;
  determining, based on the second data and the third data, fourth data that is representative of the AMD with respect to the physical space;
  determining, using the fourth data and the first planning algorithm, a first response, wherein the first response indicates no further plan data;
  determining, using the fourth data and a second planning algorithm, second plan data indicative of the second pass of the physical space; and
  performing the second pass by operating the AMD based on the second plan data.

11. The method of claim 10, wherein the second data comprises one or more poses, wherein each pose of the one or more poses is:
  indicative of a respective location with respect to the physical space;
  indicative of a respective orientation with respect to the physical space; and
  is associated with keyframe data acquired at the respective location and in the respective orientation, wherein the keyframe data is indicative of one or more features associated with operation of a simultaneous localization and mapping (SLAM) algorithm.

12. The method of claim 10, further comprising:
determining a set of planning algorithms, wherein each planning algorithm of the set of planning algorithms accepts as input all data about the physical space that is available at execution of the each planning algorithm.

13. The method of claim 10, further comprising:
determining, during operating the AMD based on the second plan data, fifth data using the one or more sensors; and
determining, based on one or more of the first data, the third data, or the fifth data, map data comprising:
  feature data that is indicative of one or more features of the physical space that are associated with operation of a simultaneous localization and mapping (SLAM) algorithm; and
  occupancy map data that is indicative of locations of one or more obstacles in the physical space;
wherein at least a portion of the map data is input to each planning algorithm of a set of planning algorithms.

14. The method of claim 10, further comprising:
determining, during operating the AMD based on the second plan data, fifth data using the one or more sensors;
determining, based on the first data, the third data, and the fifth data, map data that is representative of at least a portion of the physical space;
determining a first location of the AMD in the physical space;
receiving an instruction to move the AMD to a second location in the physical space;
determining, based on the map data, third path plan data indicative of a path from the first location to the second location; and
operating the AMD based on the third path plan data.

15. The method of claim 10, further comprising:
determining, during operating the AMD based on the second plan data, fifth data using the one or more sensors;
determining, based on the fourth data and the fifth data, sixth data that is representative of the AMD with respect to the physical space;
determining, based on the sixth data and the second planning algorithm, a second response, wherein the second response is indicative of no further plan by the second planning algorithm;
determining, based on the sixth data and a third planning algorithm, third plan data;
operating the AMD based on the third plan data; and
determining seventh data using the one or more sensors.

16. The method of claim 10, wherein a set of planning algorithms comprises:
the first planning algorithm that causes the AMD to explore an area in the physical space for which no previous knowledge is available;
the second planning algorithm that causes the AMD to:
  determine a previously stored first location in the physical space that is associated with loop closure;
  move the AMD to the first location; and
  perform, at the first location, a loop closure operation;
a third planning algorithm that causes the AMD to determine that a current location of the AMD in the physical space is a candidate for loop closure;
a fourth planning algorithm that causes the AMD to move to a third location in the physical space, wherein the third location is associated with a frontier of a previously unexplored area of the physical space; or
a fifth planning algorithm that causes the AMD to move to a previously stored fourth location in the physical space, the fourth location being associated with a beginning of exploration of the physical space.

17. The method of claim 10, wherein the first plan data comprises one or more of:
a first instruction to pause movement of the AMD for an interval of time;
a second instruction to rotate the AMD;
a third instruction to move the AMD in a first pose;
a fourth instruction to move the AMD to a first location that is within a first area of the physical space; or
a fifth instruction to operate the one or more sensors.

18. An autonomous mobile device (AMD) comprising:
one or more sensors;
one or more memories storing computer-executable instructions; and
one or more processors to execute the computer-executable instructions to:
  determine first data that is representative of the AMD with respect to a physical space;
  initiate exploration of the physical space, wherein the exploration comprises a first pass of the physical space and a second pass of the physical space;
  determine, using at least the first data and a first planning algorithm, first plan data indicative of the first pass of the physical space;
  perform the first pass by operating the AMD based on the first plan data;
  determine second data using the one or more sensors;
  determine, based on the first data and the second data, third data that is representative of the AMD with respect to the physical space;
  determine, using at least the third data and the first planning algorithm, a first response, wherein the first response is indicative of no further plan by the first planning algorithm;
  determine, using the third data and a second planning algorithm, second plan data indicative of the second pass of the physical space;
  perform the second pass by operating the AMD based on the second plan data;
  determine fourth data using the one or more sensors;
  determine, based on one or more of the second data or the fourth data, map data that is representative of the physical space; and
  operate the AMD based at least in part on the map data.

19. The AMD of claim 18, wherein the map data comprises:
feature data that is indicative of one or more features associated with operation of a simultaneous localization and mapping (SLAM) algorithm; and
occupancy map data that is indicative of locations of one or more obstacles in the physical space.

20. The AMD of claim 18, wherein the first plan data comprises one or more of:
a first instruction to pause movement of the AMD for an interval of time;
a second instruction to rotate the AMD;
a third instruction to move the AMD to a first pose;
a fourth instruction to move the AMD to a first location that is within a first area of the physical space; or
a fifth instruction to operate the one or more sensors.

21. The AMD of claim 1, wherein the one or more processors further execute the computer-executable instructions to:
- determine one or more of the first planning algorithm or the second planning algorithm based on one or more of:
  - one or more environmental conditions of the physical space,
  - one or more operational conditions of the physical space, or
  - one or more temporal conditions associated with the physical space.

\* \* \* \* \*